United States Patent
Mummidi et al.

(10) Patent No.: US 9,424,062 B1
(45) Date of Patent: Aug. 23, 2016

(54) VIRTUALIZATION INFRASTRUCTURE SUPPORT

(71) Applicant: Amazon Technologies, Inc., Reno, NV (US)

(72) Inventors: Raviprasad Venkatesha Murthy Mummidi, Mountain View, CA (US); Hariharan Subramanian, Santa Clara, CA (US); Bhagyalaxmi Bethala, Palo Alto, CA (US); Ekanth Sethuramalingam, Milpitas, CA (US); Apolak Borthakur, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/223,707

(22) Filed: Mar. 24, 2014

(51) Int. Cl.
*G06F 9/455* (2006.01)

(52) U.S. Cl.
CPC .................................. *G06F 9/45558* (2013.01)

(58) Field of Classification Search
None
See application file for complete search history.

(56) References Cited

U.S. PATENT DOCUMENTS

| | | | | |
|---|---|---|---|---|
| 5,088,031 A * | 2/1992 | Takasaki et al. | | 718/100 |
| 7,281,102 B1 * | 10/2007 | Agesen et al. | | 711/163 |
| 7,516,453 B1 * | 4/2009 | Bugnion | | 718/1 |
| 7,539,987 B1 * | 5/2009 | Dey et al. | | 718/1 |
| 9,021,307 B1 * | 4/2015 | Parameswaran et al. | | 714/37 |
| 2003/0115578 A1 * | 6/2003 | Liokumovich et al. | | 717/138 |
| 2007/0050764 A1 * | 3/2007 | Traut | | 718/1 |
| 2011/0075674 A1 * | 3/2011 | Li et al. | | 370/401 |
| 2012/0047501 A1 * | 2/2012 | Box | | G06F 9/45533 718/1 |
| 2012/0254865 A1 * | 10/2012 | Saeki | | G06F 9/45533 718/1 |
| 2012/0297381 A1 * | 11/2012 | Ambat et al. | | 718/1 |
| 2013/0061047 A1 * | 3/2013 | Sridharan et al. | | 713/162 |
| 2013/0139154 A1 * | 5/2013 | Shah | | G06F 9/45558 718/1 |
| 2013/0239099 A1 * | 9/2013 | Kruglick | | G06F 8/47 717/140 |
| 2013/0239108 A1 * | 9/2013 | Lee | | G06F 9/45558 718/1 |
| 2013/0318595 A1 * | 11/2013 | Wang | | G06F 9/45558 726/16 |
| 2014/0108665 A1 * | 4/2014 | Arora | | H04L 67/141 709/227 |
| 2015/0052382 A1 * | 2/2015 | Sarisky | | G06F 9/455 714/4.11 |

* cited by examiner

*Primary Examiner* — Adam Lee
(74) *Attorney, Agent, or Firm* — Davis Wright Tremaine LLP

(57) ABSTRACT

Remote computing resource service providers allow customers to execute one or more applications in a virtual environment on computer systems provided by the computing resource service provider. The customer applications are generally executed by multiple virtual machine instances working together. The virtual machines may be managed by a hypervisor executing on computer systems operated by the service provider. Different hypervisors may support different features and have different capabilities. Customers may wish to execute the one or more applications on a particular hypervisor in order to utilize certain features. A control plane may be used to facilitate management of the virtual environment by one or more services of the computing resource service provider.

19 Claims, 11 Drawing Sheets

VIRTUALIZATION INFRASTRUCTURE SUPPORT

BACKGROUND

The use of remote computing services, such as remote program execution and remote data storage, has greatly increased in recent years. Customers may reduce expenses and overhead by purchasing these services from a computing resource service provider (also referred to as a service provider). Customer applications may be distributed over multiple virtual machine instances and computing systems. The virtual machine instances may be controlled by a hypervisor operating on a computing system. The hypervisor may provide secure partitioning of computer system resources by executing multiple virtual machine instances on a single physical host machine. Various components of the hypervisor may require privileged access to the physical host machine in order to provide effective administration of the virtual machine instances. Although a particular type of hypervisor may support a variety of different applications and operating systems, certain features of the applications or operating systems may not be supported. Furthermore, customers may prefer a particular type of hypervisor or may have a preference between different types of hypervisors.

BRIEF DESCRIPTION OF THE DRAWINGS

Various embodiments in accordance with the present disclosure will be described with reference to the drawings, in which.

DETAILED DESCRIPTION

Figure 1:
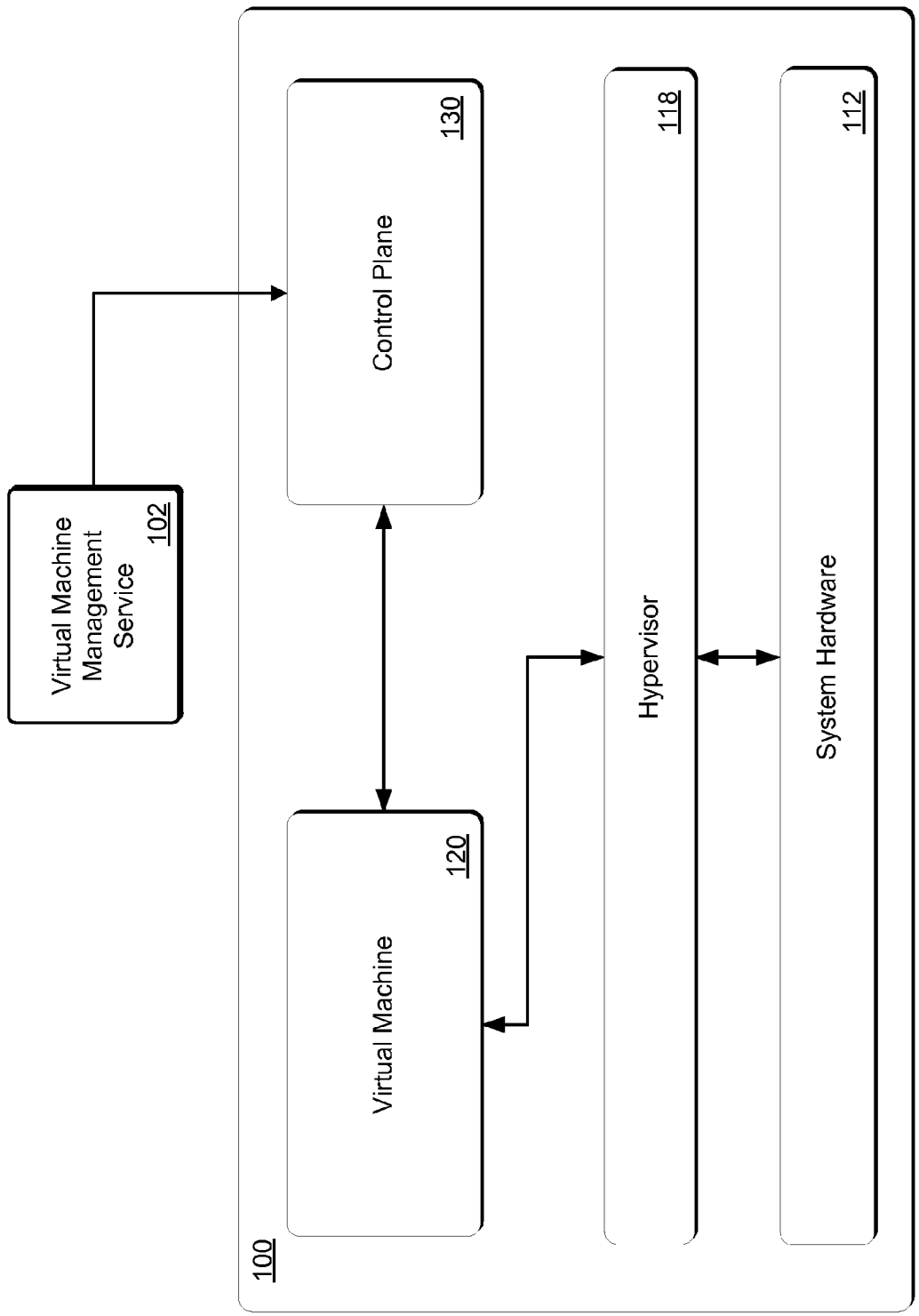
FIG. 1 shows an illustrative example of an environment in which various embodiments can be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to enhancements for virtualization infrastructure support for a virtual computing service offered by a computing resource service provider (also simply referred to as a service provider). A virtualization layer may enable virtual machines (also referred to as virtual computer systems) to interact with the underlying hardware operated by the service provider. The virtualization layer may include a hypervisor or other virtual machine manager. There are a variety of different hypervisor and/or virtual machine manager each with different features and capabilities. The service provider may offer customers the ability to select a particular virtualization layer or the service provider may determine a particular type of virtualization layer that includes particular features requested by the customer. For example, the service provider may allow the customer to select a particular type of virtual machine and underlying virtualization layer through a management console operated by the service provider. Based at least in part on the information provided by the customer through the management console, the service provider may instantiate a virtual machine with the particular virtualization layer selected by the customer.

The service provider may further provide a virtual machine management service, a network management service and a storage management service. The virtual machine management service may be responsible for managing the operation of virtual machines. For example, the virtual machine management service may instantiate and terminate virtual machines based at least in part on customer requests. The network management service may enable the virtual machine to communicate over a network to one or more other virtual machines or other computer systems. For example, the network management system may enable a virtual private network between a plurality of virtual machines operated by users of an organization. The storage management system may provide block level storage for one or more virtual machines. For example, the storage management system may provide a storage volume for a particular virtual machine to store data generated during the operation of the particular virtual machine.

The particular virtualization layer selected by the customer may not be configured to operate with the virtual machine management service, network management service, storage management service or other service. A control plane may be used be to enable the particular virtualization layer to operate with one or more service or systems of the service provider. The control plane may be a virtual machine configured to receive commands and other information from the one or more service or systems and enable the virtualization layer and any virtual machines associated with the virtualization layer to the commands or other information. For example, the control plane may receive information corresponding to a storage device associated with a particular virtual machine from the storage management service. The control plane may then use the received information to expose a block storage device to the particular virtual machine. Exposing the block storage device to the particular virtual machines enables the particular virtual machine to treat the block storage device as a physical device attached to the particular virtual machine. In another example, the control plane may receive a command to terminate execution of a particular virtual machine. The control plane may translate the command such that it may be executed by the virtualization layer and transmit the command to the virtualization layer. Translating the command may include converting the command from a particular format into a format that may be received and executed by the virtualization layer. Upon receiving the command, the virtualization layer may then cause the particular virtual machine to be terminated.

FIG. 1 is an illustrative example of a computer system 100 illustrating various aspects of the present disclosure. As noted above, techniques described herein are applicable to supporting multiple virtualization layers in a distributed computing environment. Accordingly, FIG. 1 shows the computer system 100 including system hardware 112. System hardware 112 may include one or more processors, such as a central processing unit (CPU), memory, including static and dynamic memory, buses, input and output devices and storage devices. The system hardware 112 may support a hypervisor 118. The hypervisor 118 may be a bare metal or hosted hypervisor and the hypervisor 118 may manage a virtual machine 120. For simplicity, only one virtual machine 120 is shown in FIG. 1, although the hypervisor 118 may manage a plurality of virtual machines. The virtual machine 120 may execute a customer application or may be one of a plurality of virtual machines executing the customer application. The virtual machine 120 may also execute an operating system such as WINDOWS® or LINUX®. Furthermore, the virtual machine 120 may be a parent partition or root partition configured to communicate with the hypervisor 118 and manage one or more child partitions or user partitions.

The virtual machine 120 may be communicatively coupled with a control plane 130 through a host-only private network, to be described in greater detail below in connection with FIG. 5. The control plane 130 may be a virtual machine configured to enable the service provider to support multiple virtualization infrastructures by at least translating hypervisor commands, providing networking support and input and output support. The control plane 130 may also be any logical container supported or managed by a hypervisor. For example, the control plane 130 may be a collection of applications or processes whose access to the system hardware 112 is controlled by the hypervisor 118. The control plane 130 may execute user-level and kernel-level components in order to provide virtualization support. The control plane 130 may contain a networking component, a storage component and a management component. The various components of the control plane are discussed in detail below in connection with FIGS. 4-7. The control plane 130 may support multiple virtualization infrastructures by enabling a virtual machine management service 102 to issue a single type of command regardless of the particular type of hypervisor executing on the computer system 100. For example, the virtual machine management service 102 may transmit the same command to instantiate virtual machine 120 regardless of the particular type of hypervisor 118. The command may be transmitted to control plane 130, and control plane 130 may translate the command such that the command may be executed by hypervisor 118.

The virtual machine management system 102 may be a collection of computing resources collectively configured to manage one or more virtual machines executing on the computer system 100. Customers of the computing resource service provider may interact with the virtual computer systems' service, via appropriately configured and authenticated application programming interface (API) calls, to provision and operate virtual machine 120 instantiated on system hardware 112 hosted and operated by the service provider. As described above, the virtual machine 120 may be used for various purposes, such as to operate as servers supporting a website, to operate business applications, or, generally, to serve as computing power for the customer. Other applications for the virtual machine 102 may be to support database applications, electronic commerce applications, business applications, and/or other applications. The virtual machine management service 102 may allow the customer and the service provider to manage virtual machine 120.

Figure 2:
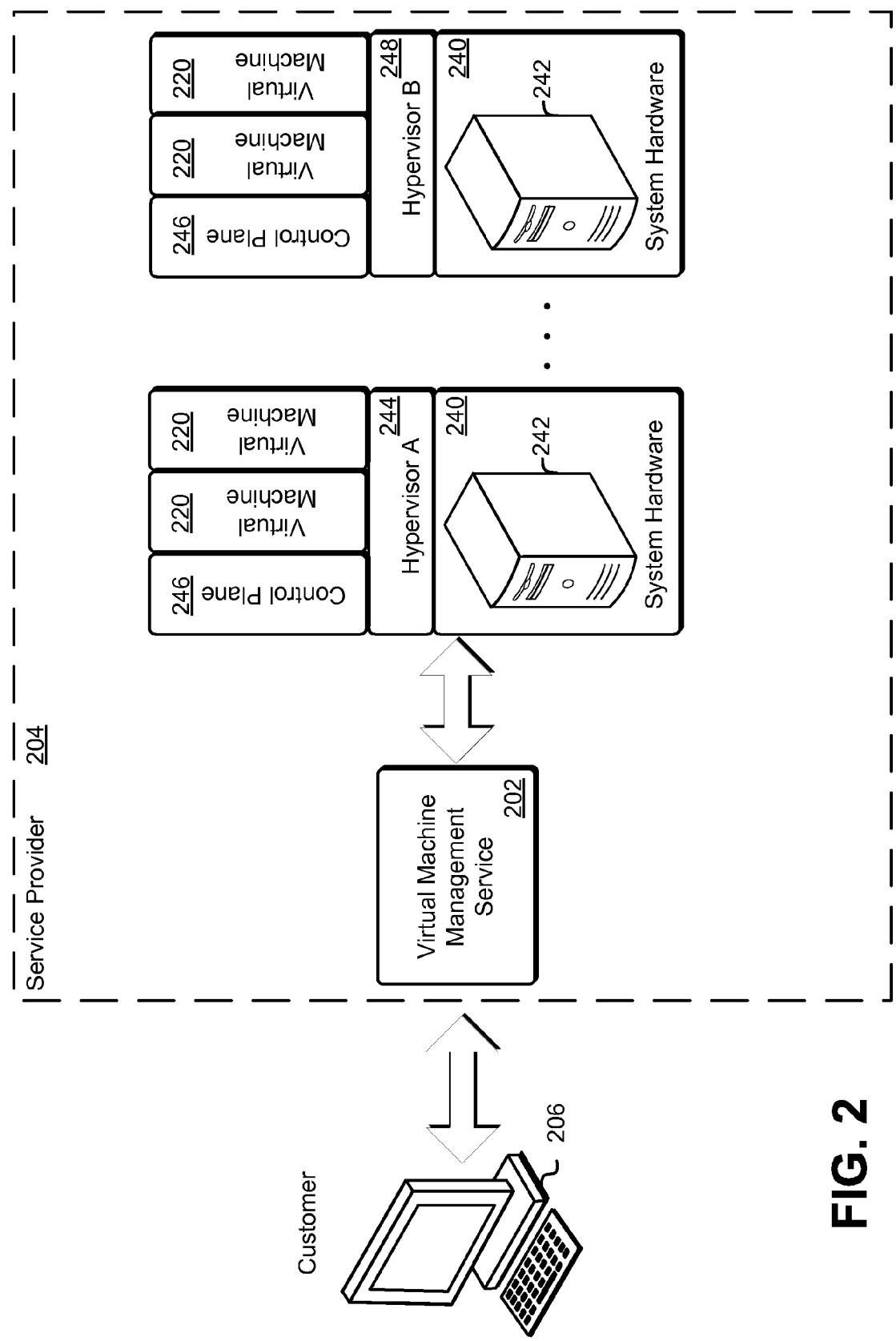
FIG. 2 shows an illustrative example of a virtual computer system service in accordance with at least one embodiment.

FIG. 2 illustrates a virtual computer system service in accordance with at least one embodiment. The virtual computer system service, which may be system hardware 240, is used by a service provider 204 to provide computation resources for customers. The system hardware 240 may include physical hosts 242. The physical hosts 242 may be any device or equipment configured to execute instructions for performing data computation, manipulation or storage tasks, such as a computer or a server. A physical host 242 may be equipped with any needed processing capability including one or more processors, such as a central processing unit (CPU), a graphics processing unit (GPU) or a digital signal processor (DSP), memory, including static and dynamic memory, buses and input and output ports that are compliant with any handshaking, communications or data transfer protocol. The system hardware 240 may also include storage devices, such as storage disks and tapes, networking equipment and the like.

A virtualization layer executing on the physical host 242 enables the system hardware 240 to be used to provide computational resources upon which one or more virtual machines 220 may operate. For example, the virtualization layer may enable a virtual machine 220 to access system hardware 240 on the physical host 242 through virtual device drivers on the virtual machine 220. The virtualization layer may include a particular type of hypervisor, such as hypervisor A 244 or hypervisor B 248. For simplicity, only two types of hypervisors are shown, although any number of different hypervisors may be supported in accordance with the present disclosure. Furthermore, physical host 242 may host multiple hypervisors of the same or different types on the same system hardware 240. Both hypervisor A 244 and hypervisor B 248 may be any device, software or firmware used for providing a virtual computing platform for the virtual machines 220. The virtual computing platform may include various virtual computer components, such as one or more virtual CPUs, virtual memory and the like. The virtual machines 220 may be provided to the customers of the service provider 204 and the customers may run an operating system or an application on the virtual machines 220. Further, the service provider 204 may use one or more of its own virtual machines 220 for executing its applications. At least a portion of the virtual machine 220 may execute kernel-level components for one or more other virtual machines 220. For example, a particular virtual machine may execute a parent partitions configured to manage one or more child partitions executed by other virtual machines, where the particular virtual machine and the other virtual machines are supported by the same hypervisor.

The control planes 246 may be virtual machines supported by a hypervisor such as hypervisor A 244 or hypervisor B 248. Although one control plane 246 is shown in FIG. 2 for both hypervisor A 244 and hypervisor B 248, multiple control planes 246 may be supported by a particular hypervisor in accordance with the present disclosure. The control planes 246 may execute various operations using virtual computer components provided by hypervisor A 244 and hypervisor B 248. The control planes 246 may receive commands and other information from the virtual machine management service 202. The commands and other information may be included in an API call from the virtual machine management service 202 to the control plane 220. The virtual machine management service 202 may enable the customer 206 to manage and operate the virtual machines 220.

For example, the customer 206 may transmit a request to the virtual machine management service 202 to terminate all virtual machines 220 operated by the customer 206. The request may be an API call including information corresponding to the customer 206 and virtual machines 220. The virtual machine management service 202 may determine the corresponding control planes 246 for the virtual machines 220 included in the request and transmit a terminate command to the control plane 246. The control plane 246 may forward the command to the parent partition responsible for virtual machines 220 and the parent partition may then forward the command to the hypervisor associated with the parent partition and at least one of the virtual machines 220 included in the command. In various embodiments, the command is transmitted directly to one or more hypervisors associated with the virtual machines 220.

In another example, the request from the customer may include a request to instantiate a particular virtual machine 220 managed by hypervisor A 244. The virtual machine management service 202 may then determine a physical host executing hypervisor A 244 on system hardware 242. The virtual machine management service 202 may then send the command to instantiate the particular virtual machine 220 to the control plane 246 supported by hypervisor A 244. The control plane may then cause hypervisor A 244 to instantiate the particular virtual machine 220. In various embodiments, the control plane 246 forwards the command to a control plane stub executing on a parent partition, the parent partition then causes hypervisor A 244 to instantiate the particular virtual machine 220.

Figure 3:
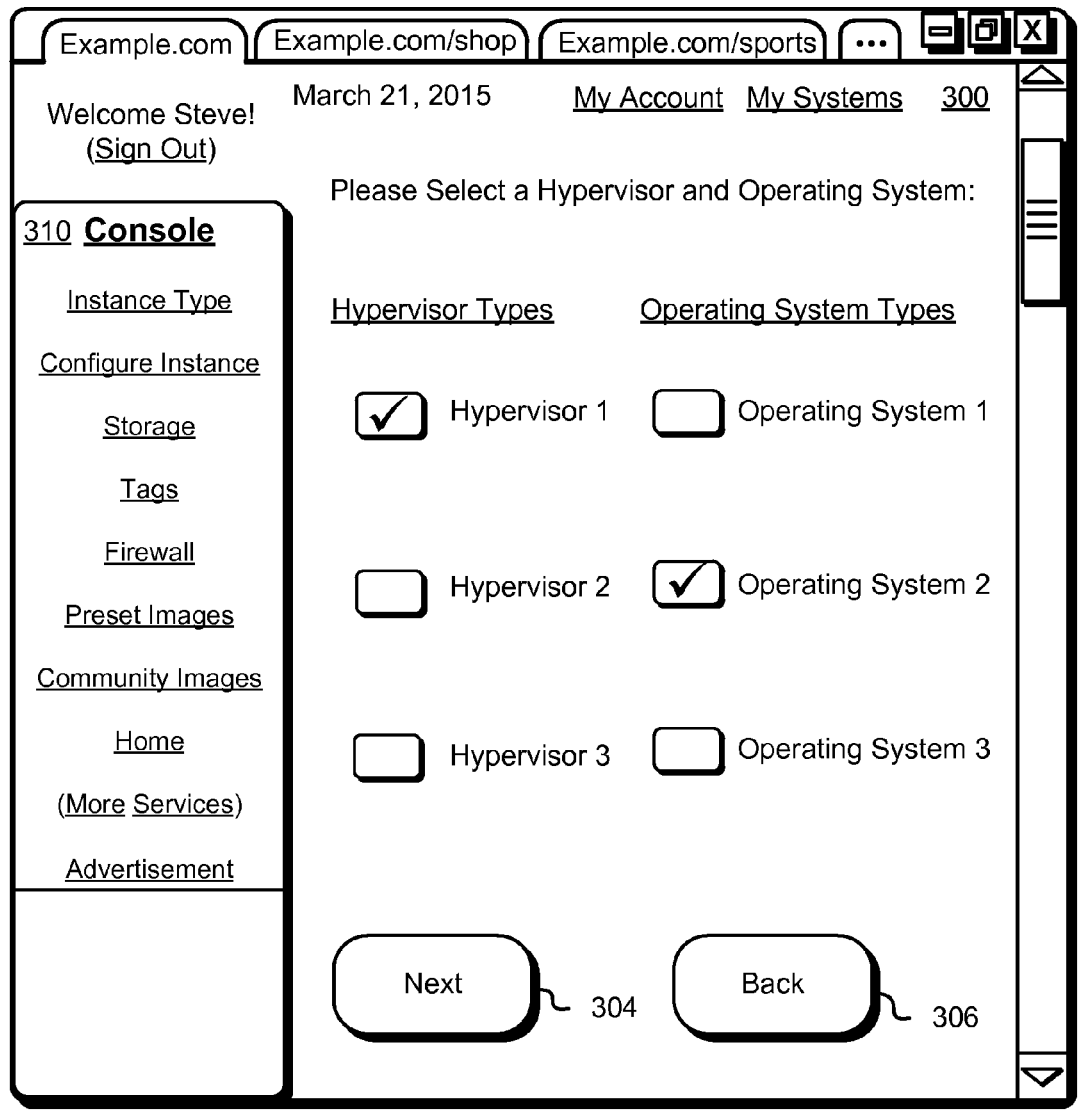
FIG. 3 shows a diagram illustrating a web page in accordance with various aspects of the present disclosure.

FIG. 3 shows a webpage 300 which may be displayed by an application executed by a computing device enabling a customer to interact with an electronic commerce website operated by an online retailer. As illustrated in FIG. 3, the webpage 300 includes various graphical user interface elements that enable customers to provision, manage and interact with virtual machine instances through a management console which the webpage 300 is a part. The webpage 300 may be displayed by various applications, such as a mobile application or web browser. In this example, the webpage 300 includes various navigational features. For instance, on the left-hand side of the webpage 300, various links 310 may link to one or more other webpages that contain additional content corresponding to a variety of different actions the customer may cause to be performed. The console pages may correspond to operations that may be taken to manage or otherwise control virtual machine instances by the virtual machine management service. In this example, the links appear as textual words which enable the links to be selected using an appropriate input device such as a keyboard, mouse, touchscreen or other input device. Selection of one of the links 310 may cause an application displaying the webpage 300 to submit, pursuant to a URL associated with the selected link by the programming of the webpage 300, an HTTP request for the content associated with the link to a server that provided the webpage 300 or another server.

In this example, the webpage 300 also includes a graphical user element configured as a "next" button 304. The next button 304 may be a graphical user interface element of the webpage 300 where the underlying code of the webpage 300 is configured such that selection by an input device of the next button 304 causes information corresponding to the selection of a hypervisor type and operating system type on the webpage 300 to be transmitted to one or more servers of the service providers, such as the servers responsible for executing the virtual machine management service. Through the management console, the customer may be guided through the process of setting up a virtual machine instance. The process may be divided into steps and the customer make be prompted to provide information at each step. For example, the webpage 300 displays to the customer a list of different types of hypervisors and different types of operating systems. The customer, using an input device, may select a particular type of hypervisor and a particular type of operation system. The customer selection may be stored until the entire process is completed or the customer selection may be transmitted to the virtual machine management service upon selection of the next button 304. Although an operating systems selection is show in FIG. 3, the customer may be prompted to select any software application to be executed by the virtual machine once instantiated. Furthermore, the customer may be presented only with the option of selecting a particular type of hypervisor in the webpage 300.

In various embodiments, the service provider may determine the particular type of hypervisor for the user based at least in part on various factors such as operating system selected by the user, features of the operating system selected by the user, particular features selected by the user, applications selected by the user, availability of particular hypervisors, cost associated with a particular hypervisor or other factors suitable for selecting computer systems based on user information. In these embodiments, the user may or may not be presented with the ability to select a particular hypervisor. If the user selects a particular hypervisor and the service provider determines another hypervisor may be more appropriate, the user may be presented with the option to select between the user selected hypervisor and the service provider determined hypervisor.

The webpage 300 may also include a graphical user element configured as a "back" button 306. The back button 306 may be a graphical user interface element of the webpage 300 where the underlying code of the webpage 300 causes the application displaying the webpage 300 to navigate to a previously navigated webpage. In this example, the webpage 300 contains a prompt asking the customer to select a hypervisor and an operating system using dialog boxes associated with the particular hypervisor and operating system. The hypervisors and operating systems which are selectable using the webpage 300 may be included in webpage 300 based at least in part on customer preference, popularity among customers, features of the hypervisor and/or operating system, features selected by the customer, hypervisor and/or operating system used by an organization associated with the customer, an administrator associated with the customer, hardware systems available to the service provider or other information suitable for selecting a hypervisor or operating systems for use with one or more virtual machines.

Once the customer has made a selection using the webpage 300 and selected the next button 304, the application displaying the webpage 300 may submit an HTTP request for provision of a virtual machine supported by the selected hypervisor and executing the selected operating system. The request may be transmitted to one or more servers of service of the service provider. For example, the request may be transmitted to the virtual machine management service operated by the service provider. The virtual machine management service may then select, based at least in part on the customer selection, a computer system capable of executing the selected hypervisor and operating system and cause the computer system to instantiate a virtual machine on behalf of the customer. In various embodiments, the virtual machine management service selects a computer system that is currently executing the selected hypervisor and causes the computer system to instantiate the virtual machine on behalf of the customer. At some point in time after the virtual machine is instantiated, the virtual machine management service may pass operation of the virtual machine to the customer. The virtual machine management service or some other service of the service provider may select the computer system based at least in part on a variety of factors beyond the type of hypervisor selected by the customer, including a particular geographic area based at least in part on an IP address associated with the request and the customer, load on one or more computer systems, network traffic associated with the one or more computer systems, request response latency of the one or more computer systems or any other information suitable for selecting a computer system to instantiate one or more virtual machines.

Figure 4:
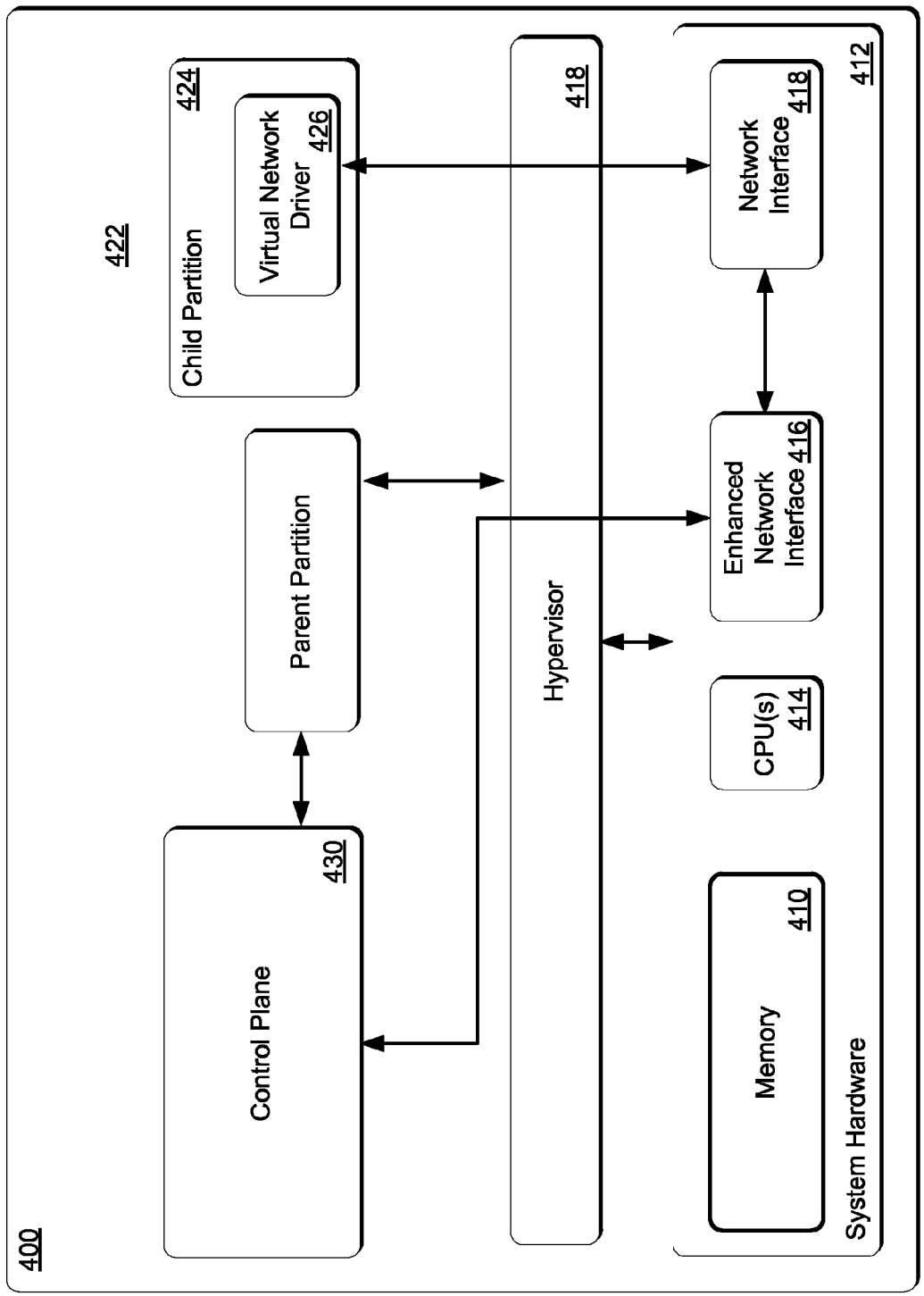
FIG. 4 shows an illustrative example of an environment which various embodiments can be practiced.

FIG. 4 is an illustrative, simplified block diagram of a computer system 400 that may be used to practice at least one embodiment of the present disclosure. The computing system 400 may contain system hardware 412, the system hardware 412 may be used to support the execution of a variety of applications. The system hardware 412 may include memory 410, one or more central processing units (CPUs), an enhanced network interface 416 and a network interface 418. The system hardware 412 may include other hardware devices not shown in FIG. 4 for simplicity, the other hardware device may storage devices, graphics devices, input output (I/O) controller or any other hardware device suitable for supporting the executing of one or more hypervisors or other applications. The one or more central processing units 412 (also referred to as processors for simplicity) that may be communicatively coupled to a number of systems or hardware devices, such as the memory 410, the enhanced network interface 416 and the network interface 418. Computer system 400 may also include several applications, including a hypervisor 418, a control plane 430, a parent partition 422 and a child partition 424. Although only one child partition 424 is illustrated in FIG. 4, multiple child partitions 424 may be supported by hypervisor 418 on computer system 400 in accordance with the present disclosure.

The hypervisor may be a collection of computing resources collectively configured to provide a virtual operating platform and manage access to the system hardware 412. The hypervisor 418 may be selected by the customer as described above in connection with FIG. 3. Furthermore, the hypervisor 418 may provide support for the control plane 430, the parent partition 422 and the child partition 424. The control plane 430 may be a collection of computing resources collectively configured to enable one or more management systems of the service provider to manage the child partitions 424. For example, the control plane 430 may receive network configuration information from the network management service, to be described in greater detail below in connection with FIG. 5, and configure the enhanced network interface 416 with the received network configuration information.

The parent partition 422 may be a collection of computing resources collectively configured to manage the child partition 424 and receive command, over a host-only private network, from the control plane 430. The parent partition 422 may also be communicatively coupled to the hypervisor 418 to enable hypervisor management commands received from the control plane to be transmitted to the hypervisor 418. The child partition 424 may be a collection of computing resources collectively configured to execute an application or a portion of an application operated by the customer. The child partition 424 may execute an operating system including user-level components such as a virtual network driver 426 illustrated in FIG. 4.

The memory 410 may provide a computer-readable storage medium for storing data that may provide the functionality of at least one embodiment of the present disclosure. The data stored in the memory 410 (programs, code modules, instructions) that, when executed by one or more processors 414, may provide the functionality of one or more embodiments of the present disclosure. These application modules or instructions may be executed by the one or more processors 414. The enhanced network interface 416 and the network interface 418 may be network interfaces connected to the computing system 400. The enhanced network interface 416 may be a collection of computing resources collectively configured to encapsulate and transmit application data, such as child partition 424 data, over a network to one or more other computing systems. The network interface 418 may be a collection of computing resources collectively configured to transmit application data, such as child partition 424 data, to the enhanced network interface 416. Although only one enhanced network interface 416 and network interface 418 are shown in FIG. 4, multiple enhanced network interfaces 416 and network interfaces 418 may be connected to computing system 400 in accordance with the present disclosure. The network interfaces 418 may be configured to send and receive application data through the virtual network driver 426 included in the child partition 424. The enhanced network interface 416 may be configured to receive application data from the network interface 418, determine routing information, based at least in part on a network map, and encapsulate application data such that the application data may be received by one or more other computer systems. Encapsulating the application data by the enhanced network interface 416 may enable network virtualization and allow the child partition 424 to communicate over a virtual network with one or more other child partitions 424. In various embodiments, the virtual network driver 426 or other kernel-level component is configured to encapsulate application data before transmitting the data to the network interface 418, the network interface 418 may then transmit the application data over the network without forwarding the application data to the enhanced network interface 416.

The enhanced network interface 416 may also receive encapsulated application data over the network and determine, based at least in part on the encapsulated application data, a particular virtual machine executing on computer system 400 to forward the application data to. For example, the enhanced network interface 416 may receive data directed to child partition 424 and de-encapsulate the data. The enhanced network interface 416 may then forward the de-encapsulated data to the network interface 418 associated with the child partition 424. The network interface 418 may then transmit, through the virtual network driver 426, the de-encapsulated data to the child partition 424. The enhanced network interface 416 may be configured with information from the control plane to enable a network management service, described in detail below in connection with FIG. 5, to manage data packets transmitted to and from child partition 424 supported by hypervisor 418.

Figure 5:
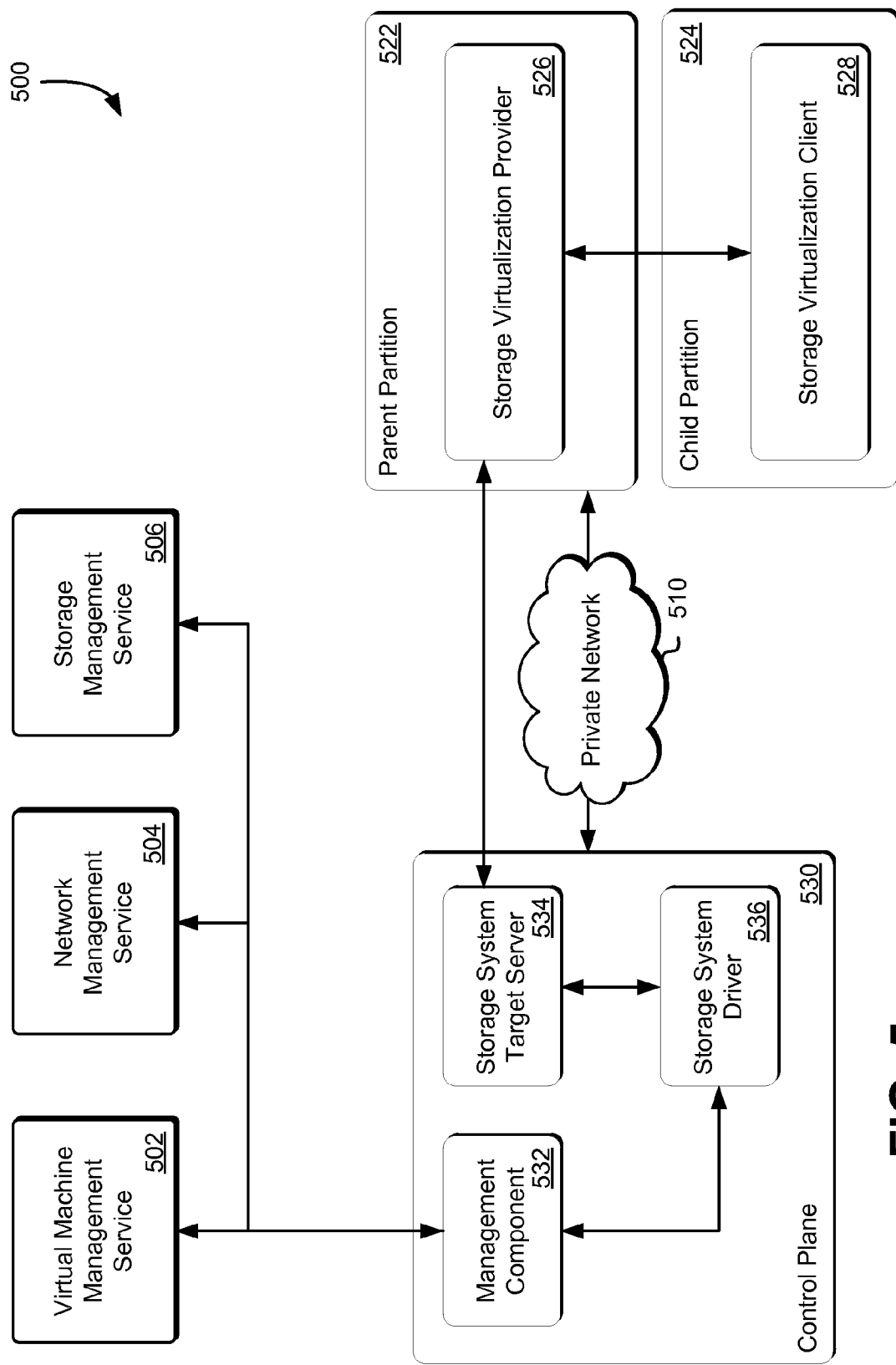
FIG. 5 shows an illustrative example of an environment which various embodiments can be practiced.

FIG. 5 shows an environment 500 in which the control plan 530 enables management of the child partition 524 by one or more services of the service provider. The control plane 530 may receive commands and other management information from the virtual machine management service 502, the network management service 504 and a storage management service 506. The various services may provide management and support for virtual machines executed by the service provider and operated by customers. The control plane 530 may execute various components in order to enable management of the child partition 524, including a management component 532, a storage system target server 534 and a storage system driver 536. The components of the control plane 530 may be executed as user-level component with support from various kernel-level components. In various embodiments, the kernel-level components are executed by the parent partition 522. Communication between the control plane 530 and the parent partition 522 may be enabled through a private network 510. The private network 510 may be a host-only network wherein the network packets do not leave the host. In various embodiments, the private network is configured with 192.168.0.0/24 IP addresses and connects only the control plane 530 to the parent partition 522.

The control plane 530, the parent partition 522 and the child partition 524 may be executed by a computer system, such as the computer system 400 described above in connection with FIG. 4. The child partition 524 may include a storage virtualization client 528 configured to enable the child partition 524 to access one or more storage block-level devices managed by the storage management service 506. The storage management service 506 may comprise one or more computing resources that collectively operate to store data generated by the child partition for the customer using block-level storage devices (and/or virtualizations thereof). The block-level storage devices of the storage management service 506 may, for instance, be operationally attached to the child partition 524 to serve as logical units (e.g., virtual drives) for the child partition 524. The block-level storage device may enable the persistent storage of data used/generated by the child partition. The block-level storage device may be provided by the storage virtualization client 528, the storage virtualization client 528 may provide drivers for communicating data and the I/O request to the storage virtualization provider 526 executed by the parent partition 522. For example, the storage virtualization client may provide Internet Small Computer System Interface (iSCSI) drivers for the attached block-level storage device enabling the I/O request to be transmitted to the storage virtualization provider 526.

The storage virtualization provider 526 may transmit the I/O request to the storage system target server 534 executed by the control plane 530. The request may be transmitted over private network 510. The storage virtualization provider 526 may also provide kernel-level support for the storage visualization client 528. Once the I/O request is received by the storage system target server 534, the control plane 530 may cause the I/O request to be converted, based at least in part on the storage system driver 536, such that the I/O request may be received and executed by the storage management service 508. Returning to the example above, the I/O request transmitted with the iSCSI drivers may be received by an iSCSI initiator executed by the system target server 534. The system target server 534 may use the storage system driver 536 to convert the iSCSI I/O request to a block-level I/O request, such as a Global Network Block Device (GNBD) request, compatible with the block-level storage devices managed by the storage management service 506. In various embodiments, the storage system target server 534 and the storage system driver 536 are implements in a separate hardware component of the computer system and the I/O request may be forwarded directly from the storage virtualization provider 526. Furthermore, the storage target server 534 and/or storage system drive 536 may support access to block-level storage systems or file-level storage systems.

The management component 532 may be a collection of computing resources collectively configured to receive commands from the one or more services of the service provider and cause the commands to be executed by the hypervisor.

The management component 532 may transmit the commands to the parent partition over the private network 510. The commands may be received at a control plane agent executing on the parent partition 522, to be discussed in greater detail below in connection with the FIG. 7, the parent partition 522 may translate the commands in order to be executed by the hypervisor. In various embodiments, the parent partition 522 causes the commands to be executed by the hypervisor.

Figure 6:
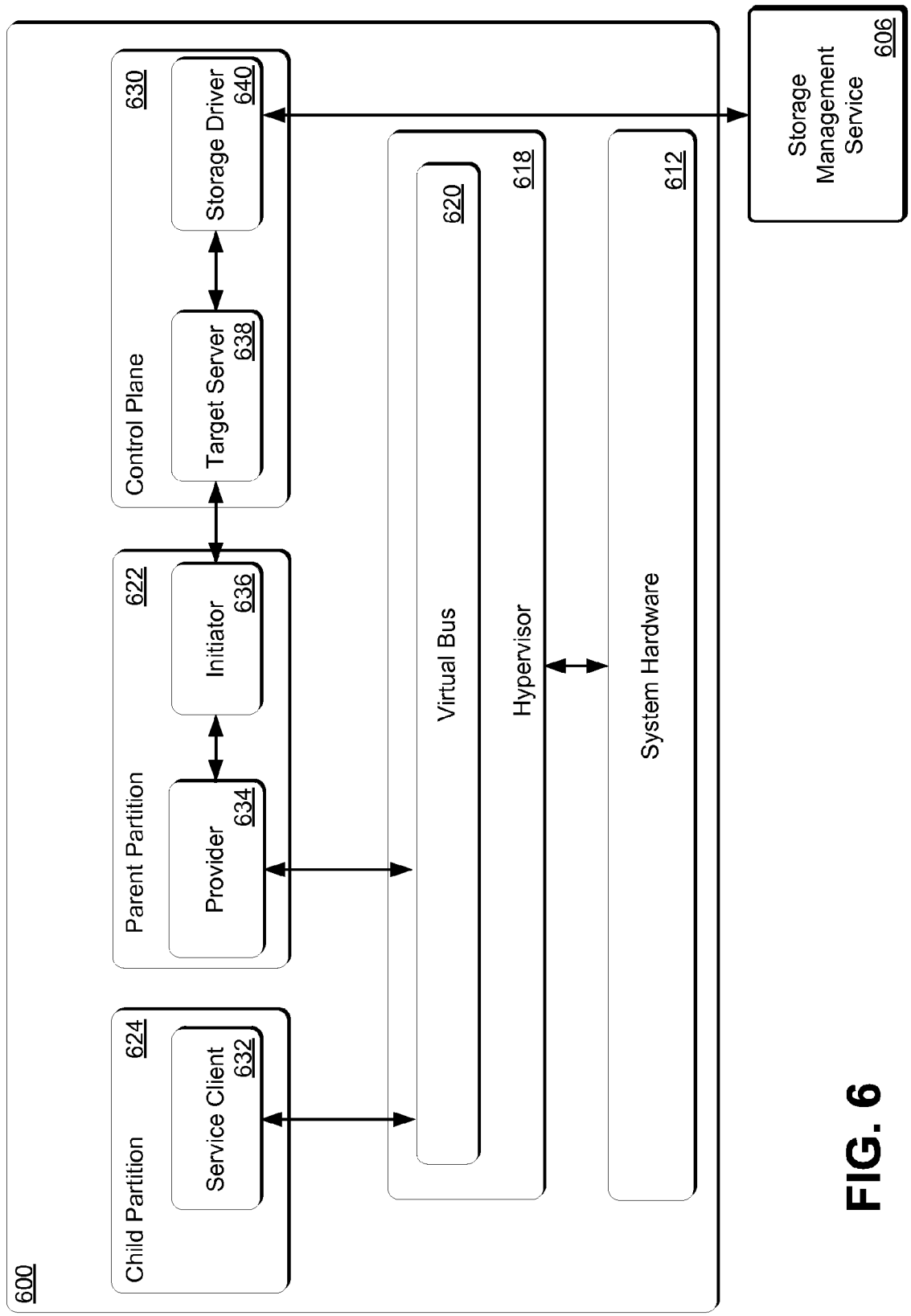
FIG. 6 shows an illustrative example of an environment which various embodiments can be practiced.

FIG. 6 is an illustrative, simplified block diagram of a computer system 600 that may be used to practice at least one embodiment of the present disclosure. The computing system 600 may contain system hardware 612, the system hardware 612 may be used to support the execution of a variety of applications. The system hardware 612 may support a hypervisor 618 configured to manage one or more virtual machines including, at least, a child partition 624, a parent partition 622 and a control plane 630. The hypervisor 618 may include a virtual bus 620, the virtual bus 620 may be a logical channel configured to enable communication between various partitions by directing request to access virtual devices exposed to the child partition 624 to the parent partition 622. For example, an I/O request generated by the child partition 624 may be transmitted over the virtual bus 620 to the parent partition 622 in order to process the request. The virtual bus 620 may transmit data over a variety of different channels such as a private network connection, a physical connection, logical connection, hardware bus, a local network connection (e.g. direct packets), writes to memory, memory bus or any other connection capable of optimal data transmission.

The child partition 624 may execute the service client 632 which may redirect request generated by the child partition 624 to a provider 634, executed by the parent partition 622, over the virtual bus 620. The provider 634 may be connected to the virtual bus 620 and may provide the child partition 622 with access to one or more devices. For example, the provider 634 may provide access to the child partition 624 to a block-level storage device. In order to provide the child partition 624 with access to one or more devices, the provider 634 may be connected to an initiator 636. The initiator 636 may be a target exposed to the parent partition 622 by the control plane 630 that enables the parent partition to transmit request over a network to a target server 638 executed by the control plane 630. For example, the initiator 636 may transmit the I/O request, received from the provider 634, over a host-only private network to the target server 638.

The target server 638 may be a collection of computing resources collectively configured to receive request from the initiator 636 over the network and process the requests. The target server 638 may further be configured to process request using a storage driver 640. The storage driver 640 may enable the target server 638 to translate request so that the request may be executed by the storage management service 606. For example, a disk I/O request from the service client 632, executed by the child partition 624, is transmitted to the provider 643, executed by the parent partition 622, through the virtual bus 620. The hypervisor 618 may then pass the disk I/O request to the initiator 636, which transmits the disk I/O request over a network to the target server 638 of the control-plane 630. The disk I/O request is converted to a block device I/O for the block-level storage device exposed by the storage management service 606 to the child partition 624. The storage driver 640 transmits the block device I/O to the storage management service 606 to process the request.

Figure 7:
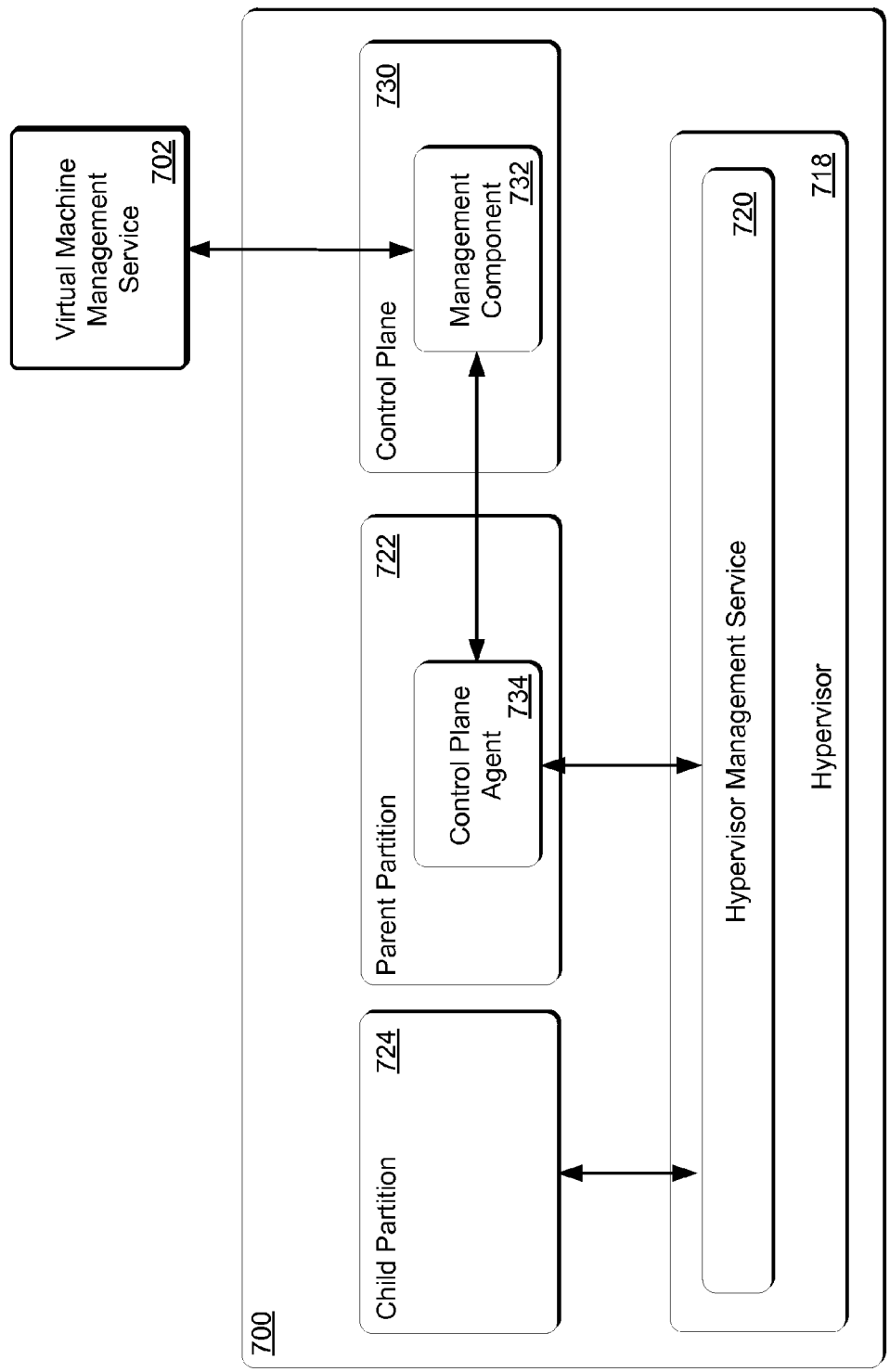
FIG. 7 shows an illustrative example of an environment which various embodiments can be practiced.

FIG. 7 is an illustrative, simplified block diagram of a computer system 700 that may be used to practice at least one embodiment of the present disclosure. The computing system 700 may contain a hypervisor 718, the hypervisor 718 may include a hypervisor management service 720. The hypervisor management service 720 may be a collection of computing resources collectively configured to receive management commands for virtual machines supported by the hypervisor and cause the commands to be executed. The hypervisor 718 may additionally support a child partition 724, and parent partition 722 and a control plane 730. The child partition 724 may execute a customer application and may be managed by the virtual machine management service 702. The parent partition 722 may be responsible for aiding the virtual machine management service 702 in management of the child partition 724. The parent partition 722 may execute a control plane agent 734 configured to receive management commands and translate the commands so that the commands can be executed by the hypervisor management service 720.

The control plane 730 may transmit commands to the control plane agent 734 executed by the parent partition 722. The control plane 730 may further execute a management component 732 configured to receive commands from the virtual machine management service 702 and transmit the commands to the control plane agent 734. The commands may be transmitted over a private network connection, the parent partition 722 and the control plane 730. Commands received by the management component 732 may be API calls identifying, at least, a particular virtual machine and an operation to be performed on the virtual machine. For example, the management component 732 may receive a command from the virtual machine management service identifying the child partition 724 and a termination operation. The management component 732 may then transmit the command over the private network to the control plane agent 734. The control plane agent may then translate the command so that it may be invoked by the hypervisor management service 720. The translated command may then be transmitted to the hypervisor management service 720, the hypervisor management service 720 may then cause the child partition 724, identified in the command, to be terminated.

Figure 8:
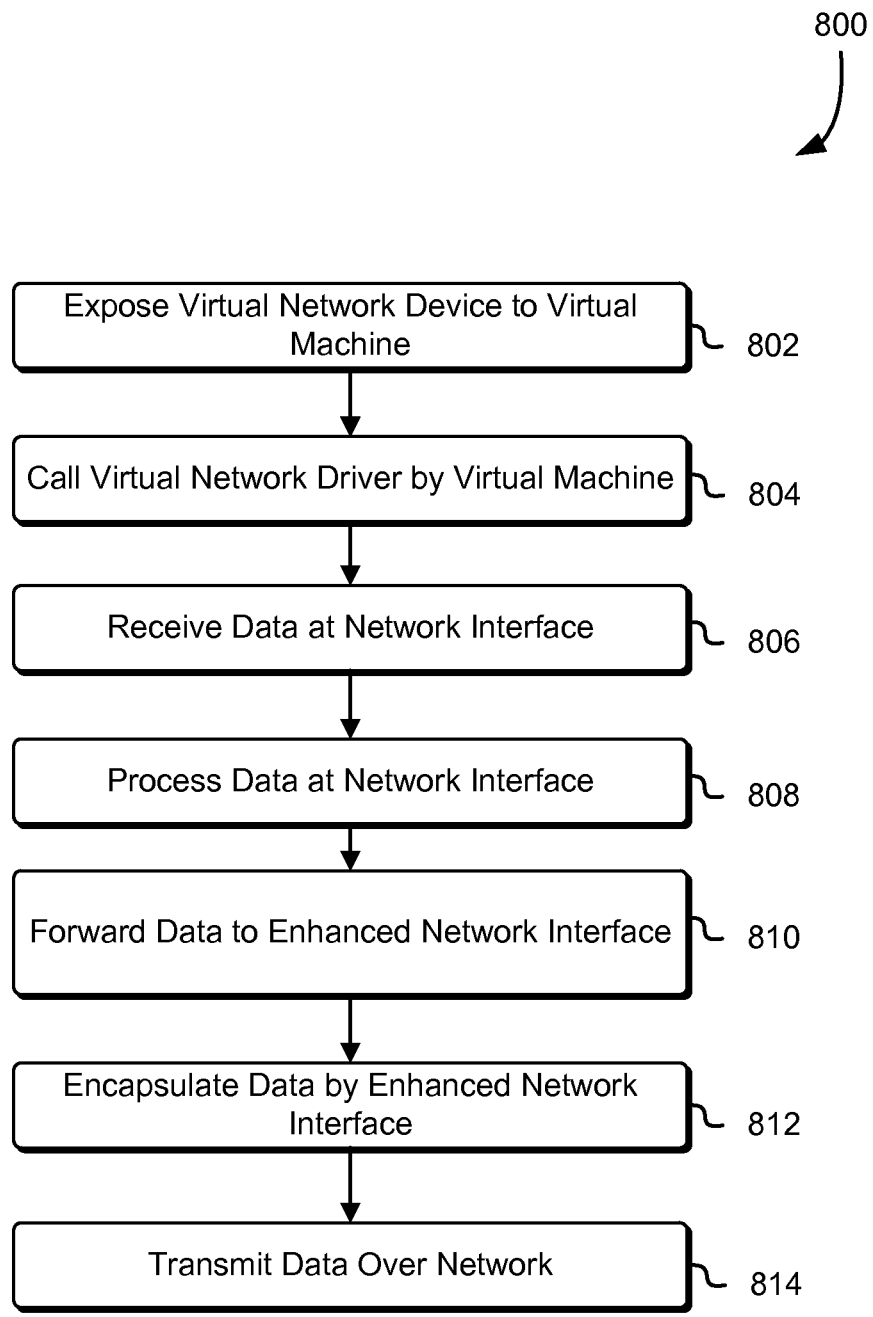
FIG. 8 shows an illustrative example of a process for transmitting a communication or other data over a network in accordance with at least one embodiment.

FIG. 8 shows an illustrative example of process 800 which may be used to transmit application data over a network. The process 800 may be performed by any suitable system, such as by the computer system 400 as described in connection with FIG. 4 and/or an appropriate component thereof, such as by the enhanced network interface 416. Returning to FIG. 8, in an embodiment, the process 800 includes exposing a virtual network driver to a virtual machine. The virtual network driver may be exposed to the hypervisor supporting the virtual machine or by another virtual machine responsible for managing the virtual machine, such as the parent partition 422 described in connection with FIG. 4. In various embodiments, the virtual network drivers may be included in an image used to instantiate the virtual machine. The virtual machine may then transmit data over the network by calling the virtual network driver 804. The virtual network drivers may provide a virtualization interface for a physical network interface, such as a network interface card connected to the computer system. Calling the virtual network driver may include the data to be transmitted over the network.

The data may then be received at a network interface 806, such as the network interface 418 described above in connection with FIG. 4. The received data may be processed by the network interface 808. Processing the received data may include dividing the data into packets and placing headers in each packet. After processing the packets, the network interface may forward the data to the enhanced network interface 810. In various embodiments, the network interface may simply forward packets to the enhanced network interface without processing the packets. The data may be forwarded to the enhanced network interface over a computer system bus connected to the network interface and the enhanced network interface, such as a peripheral component interconnect (PCI) bus. The enhanced network interface may encapsulate the data 812. The enhanced network interface may retrieve information from a network map or mapping service in order to encapsulate the data so that the encapsulated data may be received by the corresponding virtual machine or computer system. After the data is encapsulated, the encapsulated data may be transmitted over the network. The encapsulated data may be transmitted by the enhanced network interface or the network interface.

Figure 9:
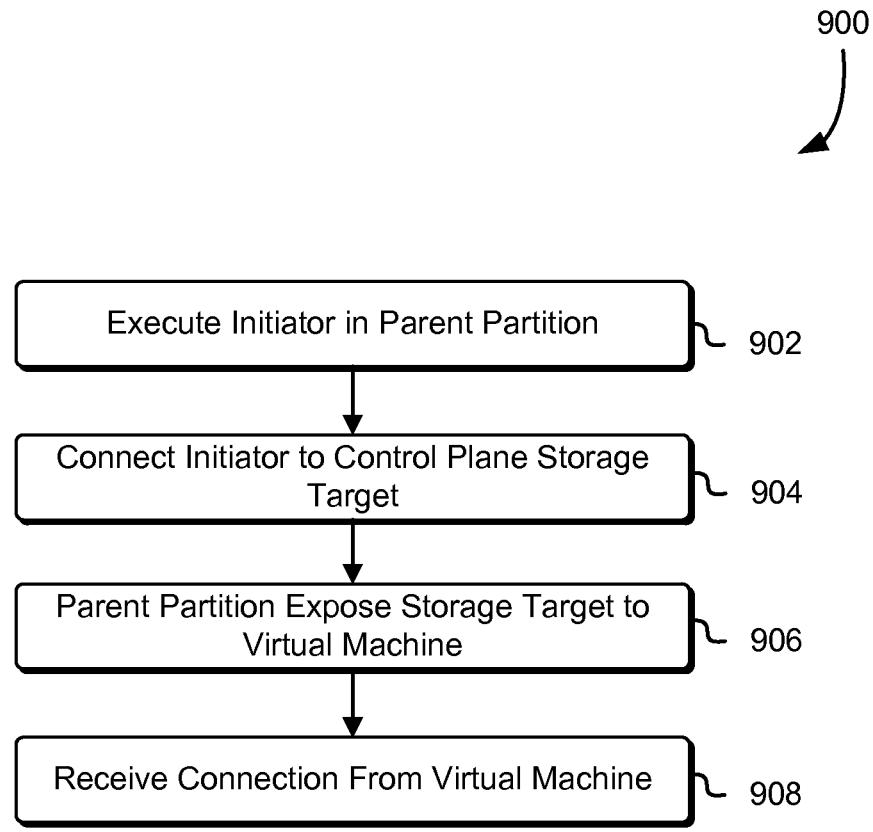
FIG. 9 shows an illustrative example of a process for transmitting data over an input/output connection in accordance with at least one embodiment.

FIG. 9 shows an illustrative example of process 900 which may be used to discover network storage devices and transmit application data over a network. The process 900 may be performed by any suitable system, such as by the computer system 600 as described in connection with FIG. 6 and/or an appropriate component thereof, such as by the target server 638. Returning to FIG. 9, in an embodiment, the process 900 includes executing an initiator in the parent partition 902. The initiator may provide an interface and connection mechanism for the I/O requests submitted to the storage management service or a block-level storage device. For example, the initiator may connect to an iSCSI target on the control plane or other storage system target server. The storage system target server may be executed by control plane 630, as described above in connection with FIG. 6. The initiator may enable the parent partition to expose a storage system target to one or more child partitions, thereby enabling the child partitions to send the I/O request over a network to the block-level storage device or file-level storage device. Returning to process 900, a parent partition may connect the initiator to the control plane storage target 904. Once the initiator is connected to the control plane storage target, the parent partition may be able to transmit the I/O request received at the initiator to the control plane. The target server may be configured to send and receive I/O requests over a network to and from the initiator. In various embodiments, the target server is configured to forward the I/O request to the storage driver so the storage driver can translate the I/O request for use with the block-level storage device.

A storage system target may then be exposed to a child partition or other virtual machine 906. The target may be a virtual device drive configured to store data generated by the virtual machine. The target may be further configured to transmit requests to the initiator, executed by the parent partition, which forwards the requests to the control plane. The parent partition may then receive a connection from the virtual machine 908. The connection may enable data to be transmitted from the child partition or other virtual machine to the storage system. Data may be transmitted first to the parent partition initiator through the connection and then from the parent partition to the control plane. The control plane may convert storage requests from the parent partition to a storage system target. The control plane may convert the request using the storage driver 640, as described above in connection with FIG. 6. Based at least in part on the converted request, the control plane or component thereof may transmit data to the storage system target. For example, the control plane may receive an I/O request and data to be stored in the block-level storage device associated with the I/O request. The control plane may convert the I/O request to a block-level storage request and transmit over a network the converted request and the data.

Figure 10:
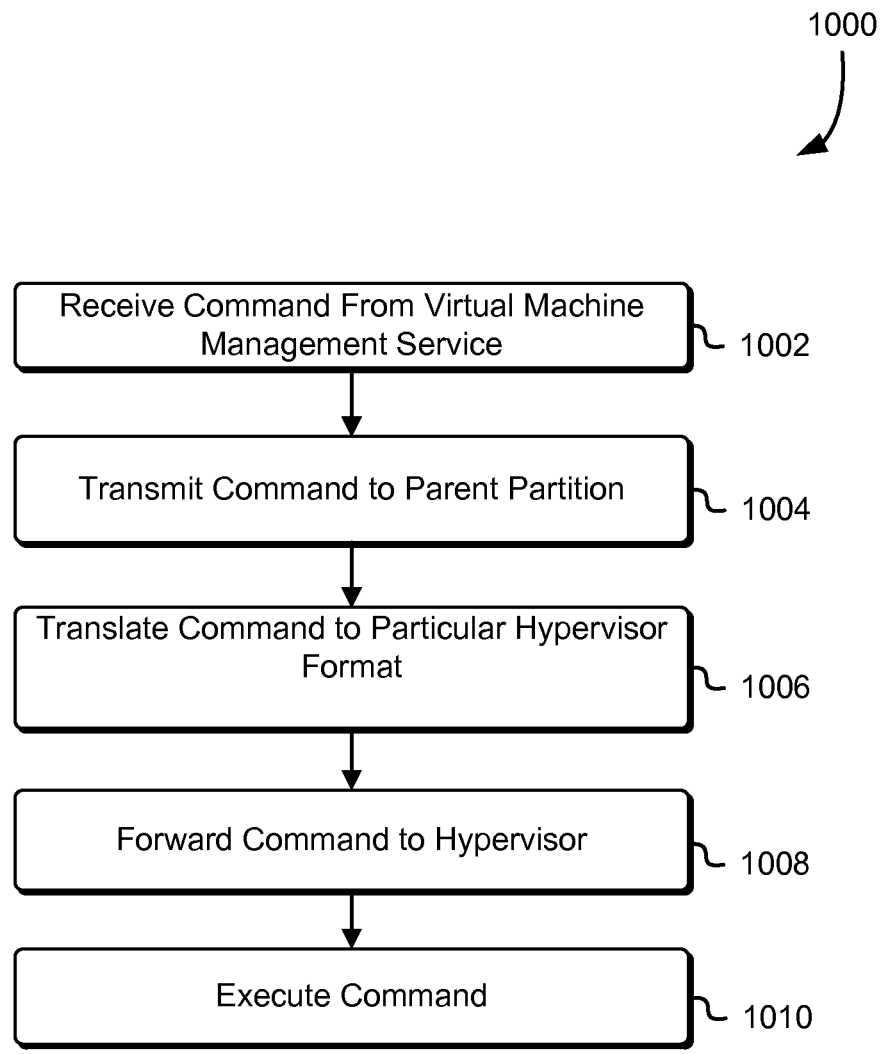
FIG. 10 shows an illustrative example of a process for receiving a hypervisor command in accordance with at least one embodiment.

FIG. 10 shows an illustrative example of process 1000 which may be used to transmit application data over a network. The process 1000 may be performed by any suitable system, such as by the computer system 700 as described in connection with FIG. 7 and/or an appropriate component thereof, such as by the management component 732. Returning to FIG. 10, in an embodiment, the process 1000 includes receiving a command from the virtual machine management service 1002. The command may be received at the control plane 730, as described above in connection with FIG. 7. The received command may be transmitted to the parent partition 1004. The command may be transmitted over the private network 510, as described above in connection with FIG. 5. The command may be received at the control plane agent executed by the parent partition. Once received by the parent partition, the command may be translated 1006 such that it may be executed by the particular hypervisor. For example, the virtual machine management service may transmit a command to terminate a virtual machine in a format that the control plane may decipher. The parent partition may translate, using one or more kernel-level components, the command to a format that may be invoked or otherwise executed by the hypervisor or component thereof.

The parent partition may the forward the translate command to the hypervisor 1008. The parent partition may forward the command over the virtual bus 620, as described above in connection with FIG. 6. The command may be transmitted as an API call or service call. In various embodiments, the parent partition forwards the translated command directly to the hypervisor management service. Once received, the hypervisor may cause the command to be executed or simply execute the command. Returning to the example above, once the hypervisor or hypervisor management service has received the command to terminate the virtual machine instance, the hypervisor may transmit another command to the particular virtual machine to terminate operation. The hypervisor may also terminate the virtual machine instance directly without transmitting the command to the virtual machine instance.

Figure 11:
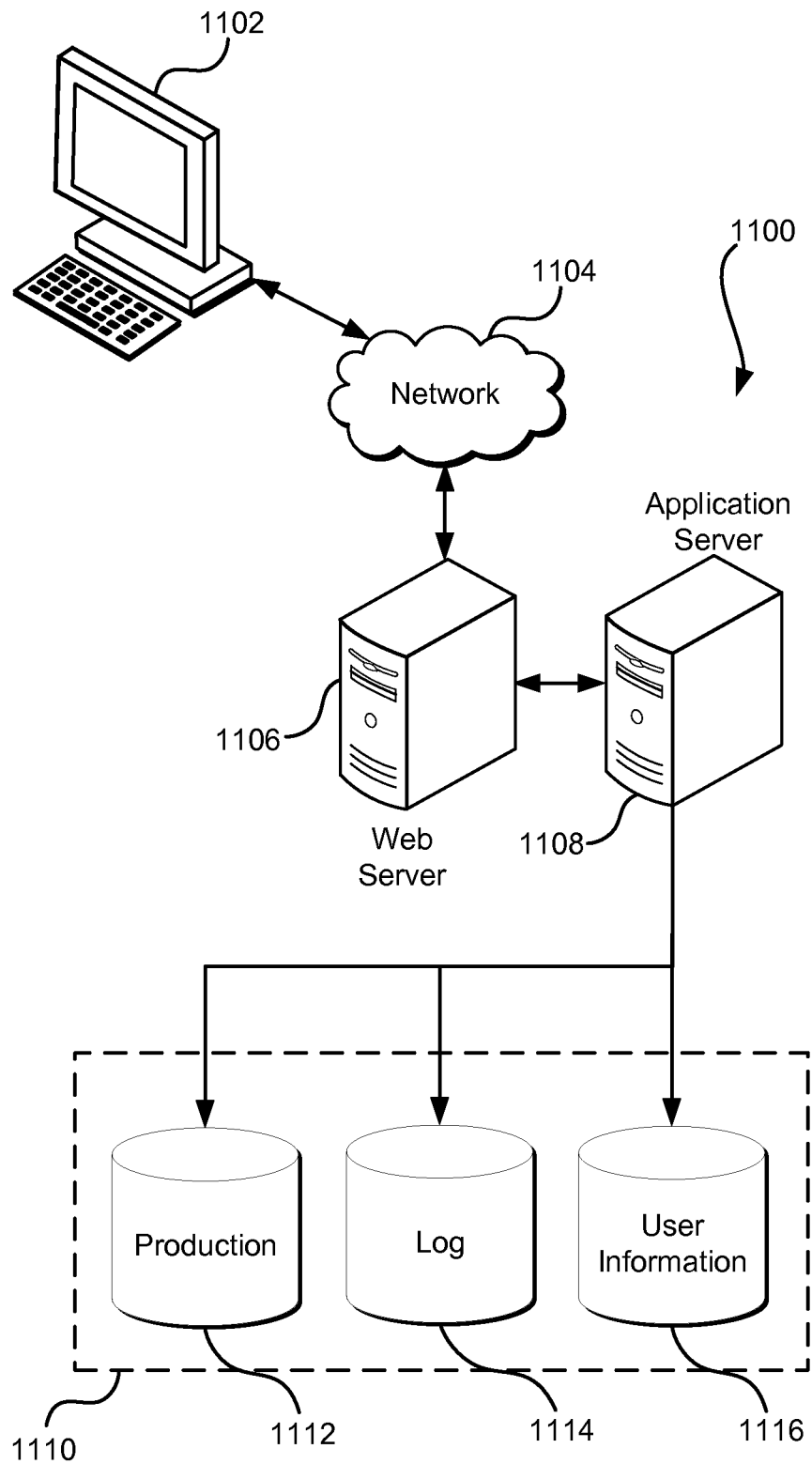
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for supporting virtualization infrastructure, comprising:
   under the control of one or more computer systems configured with executable instructions,
      instantiating a parent partition, a child partition and a control plane managed by a hypervisor, the hypervisor being of a particular type;
      causing the parent partition to execute a control plane agent, the control plane agent configured to at least:
         receive one or more hypervisor commands from the control plane;
         translate the one or more hypervisor commands received from the control plane, based at least in part on the particular type of the hypervisor, so as to generate one or more translated hypervisor commands; and transmit the one or more translated hypervisor commands to the hypervisor;

transmitting data over a network, through a network interface by at least:

receiving data, included in a call to a virtual network driver of the child partition, to be transmitted to the network interface configured to encapsulate the data; and transmitting the encapsulated data over the network via the network interface;

causing the child partition to execute a storage virtualization client, the storage virtualization client configured to transmit requests to the parent partition;

receiving, over a hypervisor bus, at a storage virtualization provider executed by the parent partition, data to be stored by a storage system target server executed by the control plane; and transmitting, through an initiator of the parent partition connected over a network to the storage system target server, the received data to the storage system target server, the control plane configured to convert the received data and store the converted data in the storage system target server.

2. The computer-implemented method of claim 1, wherein the child partition managed by the hypervisor is instantiated at least in part on a customer request indicating the particular type of the hypervisor and a particular application to be executed by the child partition.

3. The computer-implemented method of claim 2, wherein the customer request causes a virtual machine management service to select a particular computer system of the one or more computer systems to instantiate the child partition, where the particular computer system is executing the particular type of the hypervisor.

4. The computer-implemented method of claim 1, wherein the computer-implemented method further includes:

receiving, at the control plane, a command from a virtual machine management service; and transmitting the command, over a private network, to the control plane agent executed by the parent partition.

5. A system, comprising:

one or more computing devices that include a first computing device comprising memory including executable instructions that, when executed by one or more processors, implement:

a control plane configured to forward a command indicating one or more operations;

a hypervisor, having a particular type, managing the control plane, and configured to execute a hypervisor command;

a user partition communicatively coupled to a storage device of the control plane over a network, the user partition transmitting an input output request from an initiator of the user partition to the storage device;

a storage system driver of the control plane configured to convert the input output request to a storage request such that data of the input output request is stored in the storage device;

a network interface configured to encapsulate data generated by the user partition and transmit the generated data over the network; and an agent, executed by the user partition, configured to receive the command from the control plane, translate the command to the hypervisor command, and transmit the translated hypervisor command to the hypervisor, the translating of the command being based at least in part on the particular type of the hypervisor.

6. The system of claim 5, wherein a child partition includes a service client configured to transmit data over a virtual bus to the control plane.

7. The system of claim 6, wherein transmitting the input output request from the initiator further includes transmitting the input output request over the virtual bus to the service client.

8. The system of claim 6, wherein the system further includes a second computing device with a memory including executable instructions that, when executed by one or more processors, cause the system to:

transmit network configuration information; and cause the control plane to configure the network interface according to the network configuration information.

9. The system of claim 5, wherein the network interface is further configured to receive data from the user partition.

10. The system of claim 5, wherein the system further includes a second computing device with a memory including executable instructions that, when executed by one or more processors, cause the system to:

receive a customer request indicating the particular type of the hypervisor; and select a computing device of the one or more computing devices executing the particular type of the hypervisor to fulfill the customer request.

11. The system of claim 5, wherein the control plane is further configured to forward the command over a host-only private network.

12. The system of claim 5, wherein the system further includes a second network interface configured to transmit data generated by a child partition to the network interface.

13. A non-transitory computer-readable storage medium having collectively stored thereon executable instructions that, when executed by one or more processors of a computer system, cause the computer system to at least:

instantiate a first computer system instance, a second computer system instance and a control plane, such that the first computer system instance, the second computer system instance and the control plane are managed by a hypervisor, the hypervisor being of a particular type;

configure the control plane to transmit one or more management commands to the first computer system instance, the one or more management commands used for the management of the second computer system instance;

transmit encapsulated data over a network where the data was encapsulated by a first network interface;

receive data generated by a virtual storage client of the second computer system instance at the first computer system instance;

transmit the generated data to the control plane, the control plane configured to convert and store the generated data in a networked storage system associated with the control plane;

receive a management command at the first computer system instance; and translate the command, the translating of the command being based at least in part on the particular type of the hypervisor and performed such that the command is forwarded to and executed by the hypervisor.

14. The non-transitory computer-readable storage medium of claim 13, wherein the instructions further comprise instructions that, when executed by the one or more processors, cause the computer system to configure a virtual private network such that the control plane and the first computer system instance communicate over the virtual private network.

15. The non-transitory computer-readable storage medium of claim 13, wherein the instructions that cause the computer system to transmit the generated data to the control plane further include instructions that cause the computer system to transmit the generated data to the control plane from a storage virtualization provider, executed by the first computer system instance, over a private network.

16. The non-transitory computer-readable storage medium of claim 13, wherein the instructions that cause the computer system to instantiate the second computer system instance further include instructions that cause the computer system to configure the second computer system instance to include virtual network drivers configured to transmit data to a second network interface, where the second network interface forwards at least a portion of the data received from the second computer system instance to the first network interface.

17. The non-transitory computer-readable storage medium of claim 13, wherein the instructions that cause the computer system to transmit the generated data to the control plane further include instructions that cause the computer system to transmit the generated data through an initiator, the initiator configured to transmit data to the control plane over a network.

18. The non-transitory computer-readable storage medium of claim 13, wherein the instructions further comprise instructions that, when executed by the one or more processors, cause the computer system to instantiate one or more other computer system instances based at least in part on a customer request.

19. The non-transitory computer-readable storage medium of claim 13, wherein the instructions further comprise instructions that, when executed by the one or more processors, cause the computer system to receive, from a management service, the one or more management commands.

* * * * *